J. A. YORK.
KNIFE.
APPLICATION FILED OCT. 7, 1908.
917,829.
Patented Apr. 13, 1909.
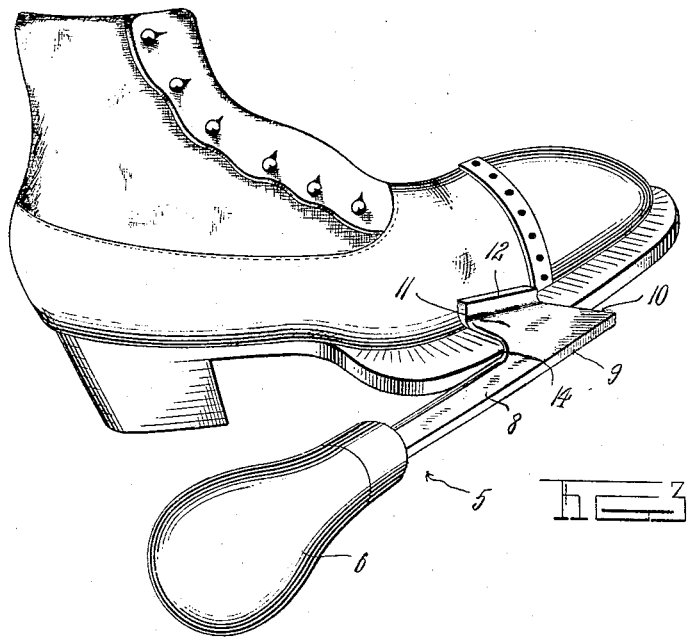
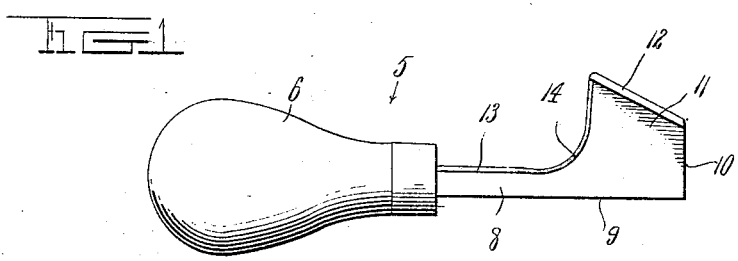
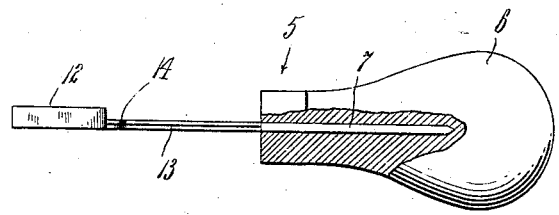
Inventor
John A. York,

UNITED STATES PATENT OFFICE.

JOHN A. YORK, OF MENA, ARKANSAS.

KNIFE.

No. 917,829.    Specification of Letters Patent.    Patented April 13, 1909.

Application filed October 7, 1908. Serial No. 456,629.

*To all whom it may concern:*

Be it known that I, JOHN A. YORK, a citizen of the United States, residing at Mena, in the county of Polk, State of Arkansas, have invented certain new and useful Improvements in Knives; and I do hereby declare the following to be a full, clear, and exact description of the invention, such as will enable others skilled in the art to which it appertains to make and use the same.

The invention relates to a knife and more particularly to the class of shoe knives.

The primary object of the invention is the provision of a knife comprising a blade having an extension or hawk bill provided with an inclined overturned guide flange, and a curved cutting edge at one side of said blade for trimming the soles of boots, shoes and the like without liability of injury to the uppers thereof.

Another object of the invention is the provision of a knife comprising a blade having a curved cutting edge and a guide flange, its construction being simple, thoroughly efficient in operation and inexpensive in the manufacture.

In the drawings accompanying and forming part of this specification is illustrated the preferred form of embodiment of the invention which to enable those skilled in the art to practice the invention will be set forth at length in the following description while the novelty of the invention will be brought out in the appended claims.

In carrying the invention into practice it may be found desirable to make changes, variations and modifications and this may be done without departing from the spirit of the invention and to come properly within the scope of the claims succeeding the description.

In the drawings: Figure 1 is a side elevation of the knife. Fig. 2 is an edge elevation of the knife blade and the handle being partly broken away. Fig. 3 is a perspective view of a shoe with the knife in operative position for trimming the sole of said shoe.

Similar reference characters indicate corresponding parts throughout the several views in the drawings.

In the drawings, the numeral 5 designates generally the shoe knife comprising a handle 6, the latter formed preferably from wood, however, it may be of any other suitable material and in one end of which is securely fastened the tine 7 of a knife blade 8, the latter formed of flat tempered steel and having a straight side edge 9 and a right angularly disposed straight end edge 10. The said blade 8 is formed at its outer extremity with a hawk bill or right angular extension 11 the latter bent on itself to form an upwardly or outwardly projecting guide flange 12 disposed on an incline with respect to the straight side edge 9 of the blade. The knife blade 8 is provided at its opposite edge with respect to the straight side edge 9 with a straight cutting edge 13 the latter terminating in a curvature 14 at one side of the hawk bill or extension 11 and which cutting edge is adapted to act upon shoe soles to trim the same and when in active position the guide flange 12 bears against the shoe upper to protect the same and prevent the cutting or injury thereof during the cutting operation of the blade.

When it is desired to bring the knife into use, an operator grips the handle 6 and positions the knife blade 8 against the work so as to have the guide flange 12 bear against the shoe upper with the cutting edge 13 toward him and then places his thumb against the sole of the shoe to guide the knife blade when pulling upon the handle to trim the sole of the shoe.

What is claimed is—

1. A knife comprising a substantially L-shaped cutting blade and guide means projecting at right angles from one face of said blade, and being disposed at an angle with respect to the longitudinal extent of the latter.

2. A knife of the class described comprising a substantially L-shaped blade having an upturned end projecting at right angles from one face of the blade and being disposed at an angle with respect to the longitudinal extent of the latter, the said blade having a cutting edge terminating short of the upturned end.

3. A knife of the class described comprising a shank having a terminal extension at right angles thereto and disposed in the plane of the shank, a cutting edge formed on one longitudinal edge of said shank, the said terminal extension being provided with a curved rear cutting edge forming a continuation of the cutting edge of the shank, and a guide flange projecting from one face of the extension.

4. A knife of the class described comprising a substantially L-shaped cutting blade, a guide flange at one end of the blade and at right angles to the same, the said flange being disposed at an angle with respect to the longitudinal extent of said blade.

5. A knife of the class described comprising a shank having a terminal extension at right angles thereto and in the same plane with the shank, the said extension being bent at one edge to form an upturned guide flange disposed at an angle with respect to the longitudinal extent of said shank, a cutting edge formed on one longitudinal edge of said shank, the said terminal extension being provided with a curved rear cutting edge terminating short of the said guide flange and forming a continuation of the cutting edge of the shank.

In testimony whereof, I affix my signature, in presence of two witnesses.

JOHN A. YORK.

Witnesses:
   JNO. S. KELLY,
   J. SPENCER KELLY.